United States Patent [19]

Werner

[11] Patent Number: 4,774,444
[45] Date of Patent: Sep. 27, 1988

[54] SPEED CONTROL CIRCUIT FOR AN ELECTRIC MOTOR

[76] Inventor: Paul H. Werner, 11828 E. McNichols, Detroit, Mich. 48205

[21] Appl. No.: 42,234

[22] Filed: Apr. 24, 1987

[51] Int. Cl.$^4$ ............................................. H02P 5/16
[52] U.S. Cl. ............................ 318/345 C; 318/345 G
[58] Field of Search .......... 318/331, 327, 308, 345 C, 318/345 G

[56] References Cited

U.S. PATENT DOCUMENTS

| | | | |
|---|---|---|---|
| 3,249,839 | 5/1966 | Fay | 318/327 |
| 3,264,544 | 8/1966 | Bowers | 318/331 |
| 3,358,205 | 1/1967 | Wechsler | 318/345 G X |
| 3,424,967 | 1/1969 | Keller | 318/345 G |
| 3,553,556 | 1/1971 | Dosch et al. | 318/327 |
| 3,569,812 | 3/1971 | Bates et al. | 318/443 |
| 3,575,652 | 4/1971 | Snyder | 318/345 G |
| 3,601,673 | 8/1971 | Mason | 318/308 |
| 3,849,710 | 11/1974 | Mason | 318/331 |
| 4,061,951 | 12/1977 | Barber | 318/443 |
| 4,109,190 | 8/1978 | McNaughton | 318/609 |
| 4,246,521 | 1/1981 | Soeda et al. | 318/331 |
| 4,267,493 | 5/1981 | Roof | 318/443 |

Primary Examiner—Benjamin Dobeck
Attorney, Agent, or Firm—Gifford, Groh, VanOphem, Sheridan, Sprinkle and Dolgorukov

[57] ABSTRACT

A speed motor control circuit for an electric motor of the type which drives a louvered sign assembly between predetermined rotational positions. The speed control includes a silicon controlled rectifier which is connected in series between the motor and the power supply. A unijunction transistor has one of its bases connected to the gate of the silicon controlled rectifier to switch on, or activate, the silicon controlled rectifier whenever the unijunction transistor becomes conductive. A variable resistor controls the bias to the emitter for the unijunction transistor in order to vary the time period or duty cycle that the unijunction transistor conducts and thus the time period or duty cycle that the silicon controlled rectifier is in its conductive state. A switch assembly and timing module are also employed to activate the motor at predetermined time intervals and for a predetermined angular rotation of the motor shaft.

5 Claims, 2 Drawing Sheets

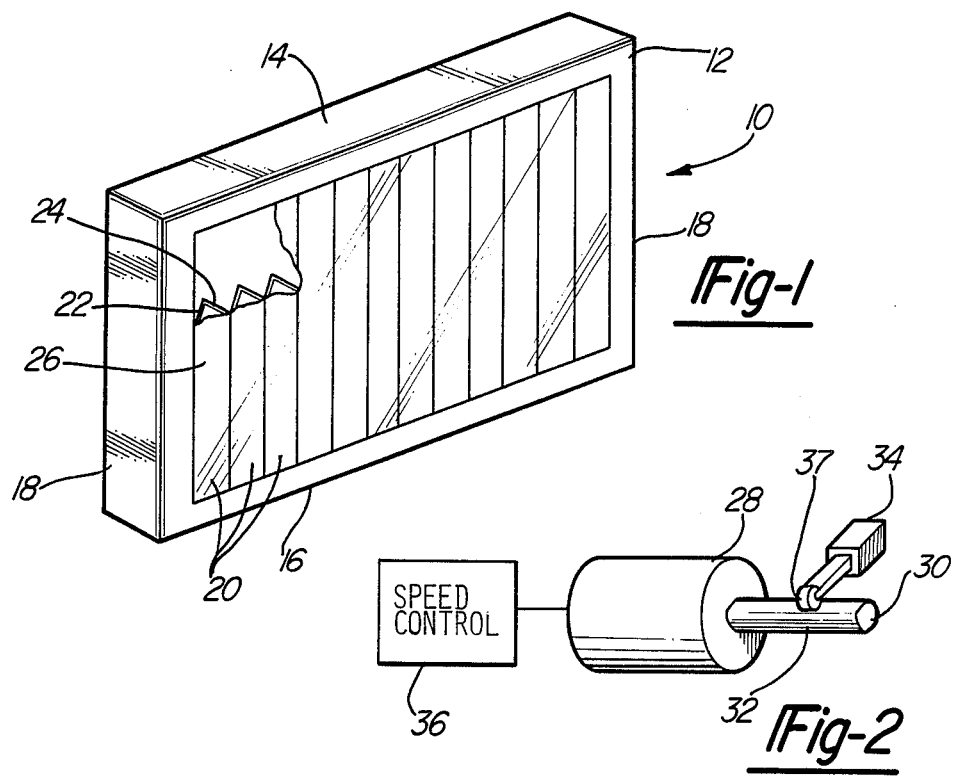
*Fig-1*
*Fig-2*
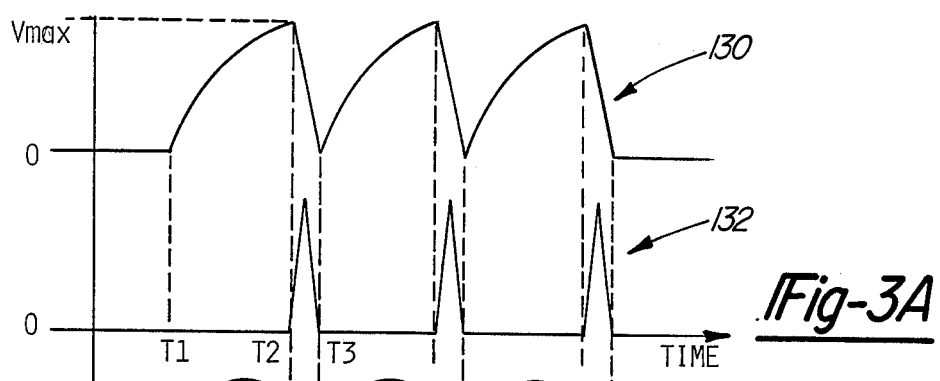
*Fig-3A*
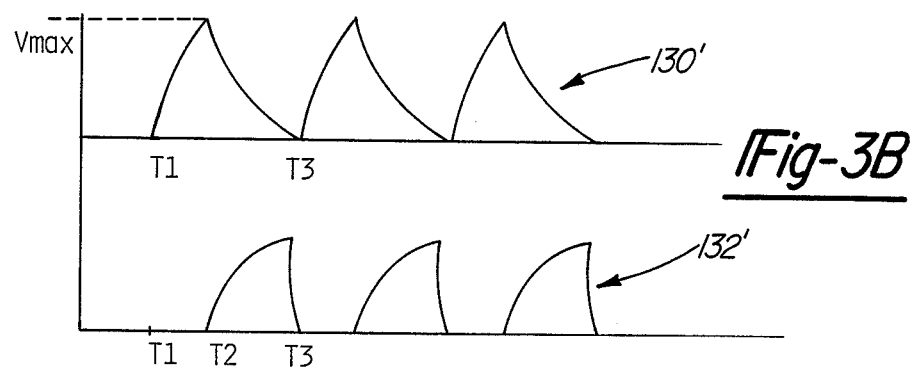
*Fig-3B*

SPEED CONTROL CIRCUIT FOR AN ELECTRIC MOTOR

BACKGROUND OF THE INVENTION

I. Field of the Invention

The present invention relates generally to a speed control circuit for an electric and, more particularly, to such a speed control circuit which is employed in a louvered sign assembly.

II. Description of the Prior Art

Louvered sign assemblies, such as that disclosed in U.S. Pat. No. 3,313,131 to Willy T. Werner on Apr. 11, 1967, are widely employed in retail establishments and the like. Such louvered sign assemblies typically comprise a rectangular frame having a plurality of louvers rotatably mounted to the frame so that the louvers are spaced apart and parallel to each other. Furthermore, each louver typically is triangular in crossectional shape and has a portion of an advertising message on each of its three sides.

Thus, in operation, the louvers are rotatably driven so that one face of all the louvers are substantially coplanar with each other thereby displaying an advertising message. After a predetermined period of time, the louvers are rotated 120° so that a second side of all of the louvers are coplanar with each other thus displaying a different advertising message and so on. Consequently, the louvered sign assembly is capable of displaying three distinct advertising messages in a sequential fashion.

One problem with these previously known louver sign assemblies is that it is relatively difficult to control the rotational speed of the louvers as they are rotated between their three angular positions. In some applications, a high rate of speed creates damage and undue wear and tear on the sign assembly, as well as the motor, thus requiring frequent and expensive repairs. Furthermore, in some cases, a low rotational speed of the louvers in the sign assembly is desired for a particular advertising effect.

Previously, there has been no previously known speed controls for a louver sign assembly which is capable of controlling the motor speed between very low and very high speeds and which also provide a soft starting and soft stopping for the motor.

SUMMARY OF THE PRESENT INVENTION

The present invention provides a speed control circuit for an electric motor for a louvered sign assembly which overcomes all of the above mentioned disadvantages.

In brief, the speed control circuit of the present invention comprises a silicon controlled rectifier (SCR) having its anode and cathode connected in series between the motor and the electric power supply. A unijunction transistor (UJT) has one of its bases connected to the gate for the SCR. Thus, when the UJT conducts, it switches on or activates the SCR thus allowing electric current to flow through the motor in the desired fashion.

In order to vary the percentage of time or duty cycle that the UJT is in a conductive state, and thus the amount of time or duty cycle that the SCR is conductive, a variable resistor varies the electric bias which is applied to the emitter for the UJT. For example, when a relatively high bias is applied by the variable resistor to the UJT emitter, the UJT conducts for only a relatively short period of time per alternating current cycle. Conversely, when the variable resistor provides a very low voltage bias to the UJT emitter, the duty cycle for the UJT, and thus the duty cycle for the SCR, increases thereby increasing the motor speed.

A relay controlled switch is also connected in series between the motor and the power supply so that energization of the motor is possible only when the relay switch is in a closed condition. A timing module, in turn, is utilized to energize a relay coil which closes the coil switch and supplies power to the motor at predetermined, but variable, time intervals.

In addition, a second switch cooperates with a cam surface secured to or formed on the motor shaft at predetermined angular positions. The second switch deactivates the relay coil for the first switch at predetermined angular positions of the motor shaft thereby stopping the motor. In the preferred embodiment of the invention, the cam surface includes three flats or lobes which are equidistantly spaced from each other.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a perspective view illustrating a louvered sign assembly;

FIG. 2 is a partial diagrammatic view illustrating a portion of the motor control for the present invention;

FIGS. 3A and 3B are timing diagrams illustrating the operation of the present invention.

DETAILED DESCRIPTION OF A PREFERRED EMBODIMENT OF THE PRESENT INVENTION

Figure 4:
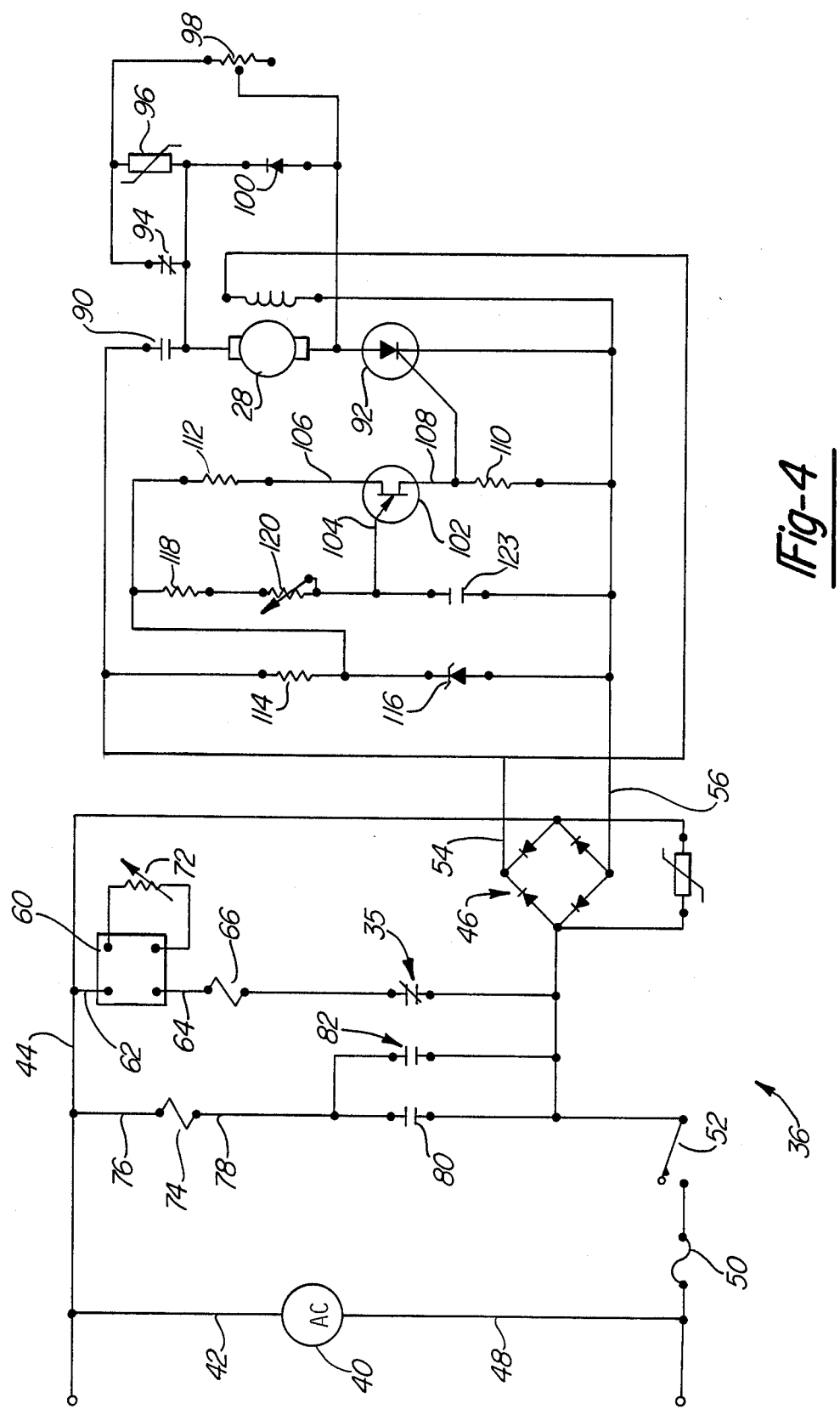
FIG. 4 is a circuit diagram illustrating a preferred embodiment of the present invention.

With reference first to FIG. 1, a perspective view of the louvered sign assembly 10 is thereshown and comprises a generally rectangular frame 12 having a top 14, bottom 16 and sides 18. A plurality of louvers 20 are rotatably mounted between the top 14 and bottom 16 of the frame 12 so that the louvers 20 are spaced and parallel from each other.

Still referring to FIG. 1, each louver 20 is triangular in crossectional shape and thus has three sides 22, 24 and 26. With the louvers 20 in the position shown in FIG. 1, the sides 26 of each louver 20 are generally coplanar with each other and typically display an advertising message of one sort or another. Furthermore, when the louvers 20 are rotated 120° about their longitudinal axis, a second side 22 or 24 of the louvers are coplanar with each other and display a different advertising message.

With reference now to FIG. 2, an electric motor 28 having an output shaft 30 is employed to rotatably drive the louvers 20 between three positions which are 120° apart from each other. Preferably, a cam surface 32 is formed on the outer periphery of the motor shaft 30, or the like secured to the motor shaft 30 and this cam surface 32 includes three cam lobes or cam flats which are spaced apart 120° from each other. A DTDP limit switch 34 has a cam follower 37 which cooperates with the cam surface 32. The switch 34 has two poles 35 and 82 (FIG. 4) which are respectively closed and open wherever the switch follower 37 is aligned with one of the flats or lobes or the cam surface 32. In addition, a motor speed control circuit 36 controls the rotational speed of the motor 28.

With reference now to FIG. 4, the speed control circuit 36 is there illustrated with the motor 28 initially in a stopped condition. At this time, one of the faces 22, 24 or 26 of the louvers 20 are coplanar with each other and the louvers 20 are stationary. At the same time, the switch 34 is aligned with one of the three flats or lobes on the cam surface 32 so that the switch poles 34 and 82 are in a closed condition.

A source 40 of alternating current is electrically connected with the circuit 36. The source 40 is preferably 120 V AC. One side 42 of the voltage source 40 is connected by a line 44 to one side of a full wave rectifier 46. Similarly, the other side 48 of the source 40 is connected through a fuse 50 and switch 52 to the rectifier 46 so that the voltage signal at the outputs 54 and 56 of the rectifier 46 is a fully rectified AC voltage as shown by wave form 58 in FIG. 3A.

Still referring to FIG. 4, a timing module 60 has its input 62 and output 64 connected in series with a relay coil 66 and the switch pole 35 of switch 34 across the voltage source 40. A variable resistor 72 is connected across two other terminals 68 and 70 on the timing module 60 for a purpose described below. The timing module 60 is conventional in construction and, in dependence upon the resistance across the terminals 68 and 70, periodically electrically closes its terminals 62 and 64 thus completing the circuit from the voltage source 40, through the relay coil 66 and switch pole 35 of switch 34.

Similarly, a second relay coil 74 has one end 76 electrically connected to the voltage source line 44 while its other side 78 is electrically connected to a parallel combination of a normally open relay switch contacts 80 associated with the relay coil 66 and the normally open switch pole 82 for the switch 34.

The circuit 36, as thus far described, operates in the following fashion. Assume that the motor shaft 30 (FIG. 2) is stationary so that the switch 34 registers with a flat or lobe on the cam surface 32 and also assume that the terminals 62 and 64 on the timing module 60 are electrically open. In this condition, the switch pole 35 on the switch 34 is in a closed position while the other switch pole 82 for the switch 34 is open.

After a time duration determined by the variable resistor 72, the timing module 60 electrically closes its terminals 62 and 64 thus completing the circuit from the voltage source 40, through the relay coil 66 and the switch pole 35 for the switch 34. Energization of the relay coil 66 closes the relay contact 80. In addition, as will be subsequently described in greater detail, upon closure of the timing module terminals 62 and 64, the motor 28 is energized and begins to rotatably drive its output shaft 30.

As the motor shaft 30 begins to rotate, the switch 34 moves out of alignment with the flat or lobe on the cam surface 32 thus moving the switch pole 35 to an open position and the switch pole 82 to a closed position. In doing so, current flow through the relay coil 66 is terminated.

Upon energization of the relay coil 66, however, the relay contacts 80 are closed which completes the electrical power connection through the relay coil 74 thereby energizing the relay coil 74. As the motor shaft 30 begins to rotate, the relay coil 66 is deenergized thus opening its contacts 80 but, at this time, the switch pole 82 for the switch 34 is in the closed position thus completing the electrical connection from the power supply 40 and through the relay coil 74.

Consequently, upon activation of the timing module 60 by closure of its terminals 62 and 64, the relay coil 74 remains energized, for a purpose to be subsequently described, until the switch 34 again registers with a flat or lobe on the cam surface 32. When this occurs, the switch pole 82 of the switch 34 opens thus breaking the electrical connection through the voltage source 40 and relay coil 74 which deenergizes the coil 74 until the next activation of the timing module 60.

Still referring to FIG. 4, the output 54 from the four way rectifier 46 is connected to one side of the normally open relay contacts 90 which are assoiated with the relay coil 74. These contacts 90 close when the relay coil 74 is activated.

The power input and output of the motor 28, the anode and cathode of a silicon controlled rectifier (SCR) 92 and the relay contacts 90 are connected in series with each other across the rectified voltage output 54 and 56 from the rectifier 46. Thus, with the relay contacts 90 closed and assuming the SCR 92 is in a conductive state, the electrical circuit from the rectifier through the motor 28 is completed thus electrically powering the motor.

A normally closed relay contact 94 associated with the relay coil 74, varistor 96, and resistor 98 are also provided across the input and output terminals for the motor 28. Thus, when the relay coil 74 is energized, the relay contact 94 opens and connects the varistor 96 in series with the resister 98 across the motor terminals. The varistor 96 thus protects the relay contacts from excessive sparking and prolongs the effective life of the relay contacts. A diode 100 also protects the relay contact through the relay contacts 94, when closed, and the resistor 98 from excessive sparking caused by reverse voltage upon deenergization of the relay coil 74.

The motor 28 is only energized when the relay contacts 90 are closed and when the SCR 92 is in a conductive state. In order to switch the SCR 92 into a conductive state, a unijunction transistor (UJT) 102 having an emitter 104 and two bases 106 and 108 is provided. The base 108 of the UJT 102 is connected directly to the gate for the SCR 92 while a resistor 110 is connected between the UJT base 108 and the rectifier output cathode so that, when current flows through the resistor 110, the voltage drop across the resistor is applied between the gate and cathode for the SCR 92 thus switching the SCR 92 into a conductive state.

The other base 106 of the UJT 102 is connected through resistors 112 and 114 to the rectifier output 54. A zener diode 116 limits the maximum voltage potential between the resistor 114 and the rectifier output 56 and thus protects the UJT 102 and SCR 92 from damage.

Still referring to FIG. 4, a fixed resistor 118 and a variable resistor 120 are electrically connected in series with each other. The side of the resistor 118 opposite from the resistor 120 is connected to the rectifier output 54 through the resistor 114 while the other side of the variable resistor 120 is connected to the emitter 104 of the UJT 102. A capacitor 123 is also connected between the UJT emitter 104 and the rectifier output 56.

With reference now particularly to FIG. 3, and assuming that the relay coil 74 is energized so that the relay contacts 90 are in a closed position, the voltage output signal across the rectifier outputs 54 and 56 is shown at waveform 58. Assuming further that the variable resistor 120 is adjusted to near its maximum resistance, the voltage differential applied across the capacitor 123, and thus between the UJT emitter 104 and the rectifier output 56, is shown at waveform 130. Consequently, between time T1 and T2, the voltage across the capacitor 123 increases from zero and to a maximum value, the Vmax, until time T2. Between time T1 and time T2, the UJT 102 is in a nonconductive state so that there is little or no current flow between the UJT bases 106 and 108. Furthermore, since the UJT 102 is in a nonconductive stage, there is no current flow through the resistor 110 and no voltage potential applied to the gate for the SCR 92 so that the SCR 92 is in a nonconductive state thus blocking current flow through the motor 28.

At time T2, the UJT 102 becomes conductive so that the capacitor 123 discharges through the emitter 104 thus rendering the UJT 102 conductive. In doing so, current flows through the UJT bases 106 and 108 and resistor 110 thus producing a voltage output at the SCR gate as shown as waveform 132 (3A). THe voltage output shown by waveform 132 thus appears only between times T2 and time T3, i.e. from the time that the capacitor 123 discharges through the UJT emitter 104 and when the voltage across the capacitor 123 reaches zero.

The SCR 92 only conducts when there is a positive voltage on its gate and thus only conducts between times T2 adn T3. Thus the duty cycle, or the percentage of time that the waveform 132 is positive, controls the on time or duty cycle of the SCR. Likewise, since the motor 28 is energized only when the SCR 92 is conductive, and thus during the duty cycle shown in waveform 132, the duty cycle of wave form 132 controls the motor speed. The waveform 132 shown in FIG. 3A is relatively small so that the motor speed is also relatively slow.

With reference now to FIG. 3B, the variable resistor 120 is adjusted to near its minimum amount so that the time betwen T1' and T2' of wave form 130', is much smaller than the corresponding times T1 and T2 of waveform 130. Thus, the capacitor 123, which discharges at time T2', discharges over a relatively longer period of time so that the UJT conducts during a longer duty cycle as shown by waveform 132' than shown by waveform 132. Likewise, the SCR 92 conducts over a longer duty cycle than that shown in FIG. 3A so that the motor 28 operates at a higher speed.

From the foregoing, it can be seen that the simple adjustment of the variable resistor 120 controls the speed of the motor 28 from essentially a zero rate of rotation and up to the maximum speed of the motor 28. Furthermore, it has been found that the motor control circuit of the present invention provides both a soft start and a soft stop for the motor which minimizes the wear and tear on the motor 28 as well as the louvered sign assembly 10. It is believed that the relatively slow rise and fall time of the waveform 132 achieves the soft start and soft stop respectively.

In practice, it has also been found that it is necessary to carefully match the UJT 102 to the SCR 92. More specifically, the SCR 92 must have a sufficient amperage rating to handle the motor current. In addition, however, the UJT must provide a sufficient voltage at its base 106 to render the SCR 92 conductive over the entire range of just slightly above a zero duty cycle for the UJT and essentially a 100% duty cycle for the UJT. Unless the UJT and SCR are properly matched, erratic operation of the motor 28 will result.

Having described my invention, however, many modifications thereto will become apparent to those skilled in the art to which it pertains without deviation from the spirit of the invention as defined by the scope of the appended claims:

I claim:

1. A speed control circuit for an electric motor having an output shaft, an inoput terminal and an output terminal which, when connected to different voltage levels, rotatably drives the motor shaft,
    a voltage source having two voltage levels,
    a silicon controlled rectifier having a gate, cathode and an anode, said anode being connected to said output terminal, said cathode being connected to one voltage level,
    said input terminal being connected to the other voltage level,
    a unijunction transistor having two bases and an emitter,
    a resistor, said resistor being connected between one base and said one voltage level,
    means for electrically connecting said one base to said gate and means for connecting the other base to said other voltage level,
    means for providing rectified alternating voltage to the gate of the unijunction transistor, said providing means including means for varying the peak to peak voltage level of said rectified alternating current from a predetermined minimum value and to a predetermined maximum value,
    a normally open relay connected in series between said other voltage level and said motor input terminal, and
    means for periodically closing said relay for a predetermined angular rotation of said motor shaft.

2. The invention as defined in claim 1 wherein said relay closing means comprises a timing module which periodically closes said relay, and a switch assembly which, following closure of said relay by said timing module, maintains said relay in a closed position for said predetermined angular rotation of said motor shaft.

3. The invention as defined in claim 1 wherein said switch assembly comprises a cam surface secured to said shaft and a cam operated switch which cooperates with said cam surface.

4. The invention as defined in claim 1 wherein said varying means comprises a variable resistor electrically connected between one voltage reference and said gate of said unijunction transistor.

5. The invention as defined in claim 1 wherein said unijunction transistor and said silicon controlled rectifier are matched so that said silicon controlled rectifier conducts sufficient current to power said motor and said unijunction transistor provides sufficient voltage on its base when conductive to switch said silicon controlled rectifier to a conductive state at substantially all levels of said peak to peak value greater than zero.

* * * * *